(12) United States Patent
Fukuri et al.

(10) Patent No.: US 12,534,621 B2
(45) Date of Patent: Jan. 27, 2026

(54) ASPHALT COMPOSITION

(71) Applicant: KAO CORPORATION, Tokyo (JP)

(72) Inventors: Norihiro Fukuri, Tokyo (JP); Hiroki Kakiuchi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 722 days.

(21) Appl. No.: 17/908,972

(22) PCT Filed: Mar. 5, 2021

(86) PCT No.: PCT/JP2021/008694
§ 371 (c)(1),
(2) Date: Sep. 2, 2022

(87) PCT Pub. No.: WO2021/177443
PCT Pub. Date: Sep. 10, 2021

(65) Prior Publication Data
US 2023/0105129 A1    Apr. 6, 2023

(30) Foreign Application Priority Data

Mar. 6, 2020  (JP) .................... 2020-039311

(51) Int. Cl.
*C08L 95/00* (2006.01)
*C08J 3/20* (2006.01)
*C08J 11/24* (2006.01)

(52) U.S. Cl.
CPC .............. *C08L 95/00* (2013.01); *C08J 3/203* (2013.01); *C08J 11/24* (2013.01); *C08J 2367/03* (2013.01); *C08J 2395/00* (2013.01); *C08J 2467/03* (2013.01); *C08J 2495/00* (2013.01)

(58) Field of Classification Search
CPC .. C08L 95/00; C08J 3/203; C08J 11/24; C08J 2367/03; C08J 2395/00; C08J 2467/03; C08J 2495/00
See application file for complete search history.

(56) References Cited

U.S. PATENT DOCUMENTS 5,070,123 A * 12/1991 Moran .................. C10C 3/02
524/68
5,558,703 A *  9/1996 Bredael ................ E01C 7/265
106/284.01
2020/0149226 A1  5/2020 Hashimoto et al.

FOREIGN PATENT DOCUMENTS

| JP | 2006096799 A | 4/2006 |
|---|---|---|
| JP | 2009276791 A | 11/2009 |
| JP | 2017125421 A | 7/2017 |
| JP | 2019019663 A | 2/2019 |
| JP | 2020200459 A | 12/2020 |
| WO | WO-2019017334 A1 | 1/2019 |
| WO | WO-2019017335 A1 | 1/2019 |
| WO | WO-2019100058 A1 | 5/2019 |

OTHER PUBLICATIONS

Extended European Search Report issued Feb. 23, 2024 in corresponding European Patent Application No. 21764612.4, 5 pages.
International Search Report issued Apr. 20, 2021 in PCT/JP2021/008694 (with English translation), 5 pages.

* cited by examiner

*Primary Examiner* — Catherine S Branch
*Assistant Examiner* — Andrea Wu
(74) *Attorney, Agent, or Firm* — Element IP, PLC

(57) ABSTRACT

The present invention provides an asphalt composition containing an asphalt and a polyester, the polyester being a polycondensate of a polyethylene terephthalate, an alcohol, and a carboxylic acid compound, the alcohol containing an alkylene oxide adduct of bisphenol A.

13 Claims, No Drawings

ASPHALT COMPOSITION

FIELD OF THE INVENTION

The present invention relates to an asphalt composition, an asphalt mixture, and methods of producing the same, and also relates to a method of paving a road.

BACKGROUND OF THE INVENTION

Asphalt pavement using an asphalt composition has been frequently performed for paving driveways, parking spaces, cargo yards, sidewalks, etc., because of relatively easy construction and a short period of time from beginning of paving works to traffic start.

In such asphalt pavement, a road surface is formed of an asphalt mixture containing aggregates bonded with each other through asphalt, and hence, the paved roads exhibit good hardness and durability.

However, a rut of wheels or a crack is generated on the asphalt-paved surface through long-term use. Therefore, in such a case, repair of the pavement is inevitably needed, which results in increased maintenance costs and significant influence on car traffic.

PTL 1 (JP 2006-096799 A) discloses, for the purpose of providing a high-value plastic composition having desired characteristics for a pavement material in which waste PET can be treated in a large amount at as low a cost as possible, a method of producing a plastic composition for a pavement material in which waste PET and one or two or more polyhydric alcohols and/or a saccharide are subjected to transesterification in the presence of a catalyst to obtain a plastic composition for a pavement material.

PTL 2 (JP 2017/125421 A) discloses, as an asphalt composition for road pavement excellent in dry strength, water immersion strength, and petroleum immersion strength, an asphalt composition for road pavement, containing an asphalt, a polyester resin, and an aggregate, the polyester resin being a polyester having a structural unit derived from an alcohol component containing 65% by mole or more of an alkylene oxide adduct of bisphenol A and a structural unit derived from a carboxylic acid component containing 50% by mole or more of one or more selected from the group consisting of terephthalic acid and isophthalic acid, the asphalt composition having a softening point of 95° C. or higher and 130° C. or lower, a hydroxyl value of 20 mgKOH/g or more and 50 mgKOH/g or less, and a ratio of the polyester resin of 5 parts by mass or more and 50 parts by mass or less relative to 100 parts by mass of the asphalt.

SUMMARY OF THE INVENTION

The present invention relates to an asphalt composition containing an asphalt and a polyester, the polyester being a polycondensate of a polyethylene terephthalate, an alcohol, and a carboxylic acid compound, the alcohol containing an alkylene oxide adduct of bisphenol A.

DETAILED DESCRIPTION OF THE INVENTION

Conventionally, when a composition containing an asphalt and a polyester is used, an asphalt composition having high dry strength can be obtained. However, an asphalt composition that can further suppress rutting of a paved surface after laying is desired. In addition, in the related arts, it has been difficult to satisfy both the suppression of rutting and the storage stability of an asphalt composition at high temperature together. For example, in the technique of PTL 2, although rutting can be suppressed, there has been a problem in the storage stability of the asphalt at high temperature.

The present invention relates to an asphalt composition that is excellent in the storage stability and that can suppress rutting of a paved surface after laying, an asphalt mixture, and methods of producing the same.

The present invention relates to the following [1] to [4].

[1] An asphalt composition containing an asphalt and a polyester, the polyester being a polycondensate of a polyethylene terephthalate, an alcohol, and a carboxylic acid compound, the alcohol containing an alkylene oxide adduct of bisphenol A.

[2] A method of producing an asphalt composition, the method including

Step 1: a step of subjecting a polyethylene terephthalate, an alcohol component containing an alkylene oxide adduct of bisphenol A, and a carboxylic acid component to a polycondensation reaction in the presence of an esterification catalyst to obtain a polyester, and Step 2: a step of mixing an asphalt with the polyester obtained in the Step 1.

[3] An asphalt mixture containing the asphalt composition according to the above [1] and an aggregate.

[4] A method of producing an asphalt mixture, the method including

Step 1: a step of subjecting a polyethylene terephthalate, an alcohol component containing an alkylene oxide adduct of bisphenol A, and a carboxylic acid component to a polycondensation reaction in the presence of an esterification catalyst to obtain a polyester, and Step 2: a step of mixing a heated aggregate, an asphalt, and the polyester obtained in the Step 1.

According to the present invention, it is possible to provide an asphalt composition that is excellent in the storage stability and that can suppress rutting of a paved surface after laying, an asphalt mixture, and methods of producing the same.

[Asphalt Composition]

The asphalt composition of the present invention (hereinafter also referred to as simply "the asphalt composition") contains an asphalt and a polyester.

In addition, the polyester is a polycondensate of a polyethylene terephthalate, an alcohol, and a carboxylic acid compound, and the alcohol contains an alkylene oxide adduct of bisphenol A.

According to the above configuration, an asphalt composition that is excellent in the storage stability and that can suppress rutting of a paved surface after laying can be obtained. Furthermore, by applying this technology, an asphalt mixture and a method for producing an asphalt mixture can be provided.

The reason why the effect of the present invention can be achieved is not clear, but is supposed as follows.

When polyethylene terephthalate (hereinafter also referred to as "PET") is added into an asphalt without any processing, since the melting point of the PET is a relatively high temperature of 260° C., the PET is present in paving as masses that remain to have original particle diameters thereof, which is a factor of reduction in the rutting resistance of the asphalt mixture. Although a method in which a PET oligomer obtained by hydrolyzing PET in an autoclave is added to an asphalt is also disclosed, the molecular weight of the oligomer is as low as about 1000 and enhancement in the rutting resistance is not achieved.

In contrast, the polyester used in the present invention is a polycondensate of PET, an alcohol, and a carboxylic acid compound. A transesterification reaction occurs by subjecting PET to polycondensation with an alcohol component and a carboxylic acid component, and thus a structural unit of PET is incorporated into an alcohol component-derived structural unit and a carboxylic acid component-derived structural unit in the polyester. In addition, the alcohol component contains an alkylene oxide adduct of bisphenol A. By containing a hydrophobic alkylene oxide adduct of bisphenol A, the polyester can be dispersed finely in a hydrophobic asphalt. Since a hydrophilic PET structure incorporated in the polyester strongly interacts with asphaltene contained in the asphalt while retaining the finely dispersed state, the asphalt and an aggregate can be tightly bound, and the rutting of a paved surface after laying could be efficiently suppressed. Furthermore, due to the finely dispersed state and the strong interaction between the PET structure and asphaltene, it is difficult for the polyester to precipitate in the asphalt, resulting also in excellent storage stability.

Note that "rutting" is the unevenness generated continuously in the longitudinal direction of a road running portion due to flowage of an asphalt layer forming a paved surface at a high temperature, for example, in summer. Rutting corelates with the plastic flow resistance of an asphalt composition which functions as a binder in asphalt pavement, and can be evaluated by the G*/sin δ of the asphalt composition (binder) according to the SUPERPAVE specification of binder (Japan Road Association, Extra Issue of Handbook for Method of Pavement Test, 1996). Here, G* indicates the complex modulus of elasticity and G* and sin δ are measured with a rheometer.

When the G*/sin δ value is larger, the plastic flow resistance is larger, and thus, the asphalt composition is then evaluated as being capable of providing asphalt pavement excellent in the rutting resistance.

Definitions and the like regarding various terminologies in this specification are hereunder described.

A "binder mixture" means a mixture containing an asphalt and a thermoplastic elastomer, and for example, it has a concept including an asphalt modified with a thermoplastic elastomer as mentioned later (hereinafter also referred to as "modified asphalt").

In the polyester, an "alcohol component-derived structural unit" means a structure resulting from eliminating a hydrogen atom from a hydroxy group of the alcohol component, and a "carboxylic acid component-derived structural unit" means a structure resulting from eliminating a hydroxy group from a carboxy group of the carboxylic acid component.

A "carboxylic acid compound" has a concept including not only a carboxylic acid but also an anhydride which is decomposed during the reaction to form an acid and an alkyl ester of a carboxylic acid (for example, the number of carbon atoms of the alkyl group is 1 or more and 3 or less). In the case where the carboxylic acid compound is an alkyl ester of a carboxylic acid, the number of carbon atoms of the alkyl group that is an alcohol residue of the ester is not included in the number of carbon atoms of the carboxylic acid compound.

[Asphalt]

The asphalt composition of the present invention contains an asphalt.

As the asphalt, various asphalts can be used. For example, besides straight asphalt which is petroleum asphalt for pavement, a modified asphalt is exemplified. Examples of the modified asphalt include blown asphalt; and an asphalt modified with a polymer material, such as a thermoplastic elastomer or a thermoplastic resin. Straight asphalt means a residual bituminous substance obtained by treating crude petroleum with an atmospheric distillation apparatus, a vacuum distillation apparatus, or the like. Blown asphalt means an asphalt obtained by heating a mixture of straight asphalt and heavy oil, then blowing the air into the mixture to oxidize them. From the viewpoint of the rutting resistance, a modified asphalt is preferred, and from the viewpoint of versatility, straight asphalt is preferred.

In this description, "asphalt" includes bitumen defined in the German industry standard DIN EN 12597. "Asphalt" and "bitumen" can be interchangeably used.

In the present invention, from the viewpoint of enhancing the rutting resistance, the asphaltene content in the asphalt is preferably 10% by mass or more, more preferably 15% by mass or more, and preferably 30% by mass or less, more preferably 25% by mass or less, further preferably 20% by mass or less, in 100% by mass of the asphalt.

The asphaltene content in the asphalt is a value measured by the Standard of the Japan Petroleum Institute, JPI-5S-22-83 "Fractional Analysis for Asphaltic Bitumen by Column Chromatography".

[Thermoplastic Elastomer]

From the viewpoint of the rutting resistance, the asphalt composition preferably contains a thermoplastic elastomer. The asphalt and the thermoplastic elastomer are preferably used as a binder mixture which is a mixture thereof. An example of the binder mixture is a straight asphalt modified with a thermoplastic elastomer (modified asphalt).

As the thermoplastic elastomer, for example, at least one selected from the group consisting of a styrene/butadiene block copolymer (hereinafter also referred to simply as "SB"), a styrene/butadiene/styrene block copolymer (hereinafter also referred to simply as "SBS"), a styrene/butadiene random copolymer (hereinafter also referred to simply as "SBR"), a styrene/isoprene block copolymer (hereinafter also referred to simply as "SI"), a styrene/isoprene/styrene block copolymer (hereinafter also referred to simply as "SIS"), a styrene/isoprene random copolymer (hereinafter also referred to simply as "SIR"), an ethylene/vinyl acetate copolymer, and an ethylene/acrylic acid ester copolymer is exemplified.

An example of a commercially available product of the ethylene/acrylic acid ester copolymer is "Elvaroy" (manufactured by DuPont de Nemours, Inc.).

Among the thermoplastic elastomers, from the viewpoint of enhancing rutting resistance, at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, and a styrene/isoprene random copolymer is preferred; and at least one selected from the group consisting of a styrene/butadiene random copolymer and a styrene/butadiene/styrene block copolymer is more preferred.

From the viewpoint of enhancing the rutting resistance, the content of the thermoplastic elastomer in the asphalt composition is preferably 0.1% by mass or more, more preferably 0.5% by mass or more, further preferably 1% by mass or more, furthermore preferably 2% by mass or more, and preferably 30% by mass or less, more preferably 20% by mass or less, further preferably 10% by mass or less, furthermore preferably 5% by mass or less, in 100% by mass of the asphalt composition.

From the viewpoint of enhancing the rutting resistance, the content of the thermoplastic elastomer in the asphalt composition is preferably 0.1% by mass or more, more preferably 0.5% by mass or more, further preferably 1% by mass or more, furthermore preferably 2% by mass or more, and preferably 30% by mass or less, more preferably 20% by mass or less, further preferably 10% by mass or less, furthermore preferably 5% by mass or less, relative to 100% by mass of the asphalt.

The content of the asphalt in the asphalt composition is, from the viewpoint of the rutting resistance and the viewpoint of exhibiting the asphalt performance, preferably 60% by mass or more, more preferably 70% by mass or more, further preferably 75% by mass or more, furthermore preferably 80% by mass or more, and from the viewpoint of improving rutting, preferably 98% by mass or less, more preferably 97% by mass or less, further preferably 96% by mass or less, in 100% by mass of the asphalt composition.

[Polyester]

The asphalt composition of the present invention contains a polyester. From the viewpoint of enhancing the storage stability and the rutting resistance, the polyester is a polycondensate of a polyethylene terephthalate, an alcohol, and a carboxylic acid compound, and the alcohol contains an alkylene oxide adduct of bisphenol A.

<Alcohol Component>

From the viewpoint of achieving excellent rutting resistance, the alcohol component contains an alkylene oxide adduct of bisphenol A, preferably contains an alkylene oxide adduct of bisphenol A represented by the following formula (I).

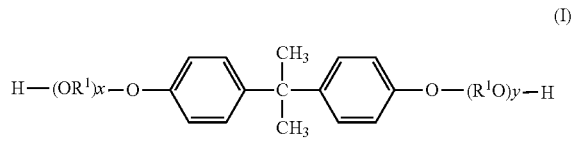

[In the formula, $OR^1$ and $R^1O$ is an alkylene oxide, $R^1$ is an alkylene group having 2 or 3 carbon atoms, x and y represent a positive number indicating the average number of moles of the alkylene oxide added, the sum of x and y is preferably 1 or more, more preferably 1.5 or more, and preferably 16 or less, more preferably 8 or less, further preferably 4 or less.]

Examples of the alkylene oxide adduct of bisphenol A represented by the formula (I) include a propylene oxide adduct of bisphenol A [2,2-bis(4-hydroxyphenyl)propane] and an ethylene oxide adduct of bisphenol A. One of the alkylene oxide adducts of bisphenol A can be used alone or two or more thereof can be used in combination.

From the viewpoints of increasing melt-dispersibility into an asphalt and achieving excellent rutting resistance, the amount of the alkylene oxide adduct of bisphenol A used is preferably 80% by mole or more, more preferably 90% by mole or more, and is 100% by mole or less, in 100% by mole of the alcohol component in the polyester.

The alcohol component may contain an alcohol component other than the alkylene oxide adduct of bisphenol A. Examples thereof include an aliphatic diol, an aromatic diol (excluding an alkylene oxide adduct of bisphenol A), and a trihydric or higher polyhydric alcohol. One of the alcohol components can be used alone or two or more thereof can be used in combination.

Examples of the aliphatic diol include ethylene glycol, 1,2-propanediol, 1,3-propanediol, 1,3-butanediol, 1,4-butanediol, 1,4-butenediol, 1,5-pentanediol, 1,6-hexanediol, neopentyl glycol, 1,10-decanediol, and 1,12-dodecanediol.

The trihydric or higher polyhydric alcohol is, for example, a trihydric alcohol. An example of the trihydric or higher polyhydric alcohol is glycerol.

<Carboxylic Acid Component>

Examples of the carboxylic acid component include an aliphatic dicarboxylic acid compound, an aromatic dicarboxylic acid compound, and a tribasic or higher and hexabasic or lower polybasic carboxylic acid compound. One of the carboxylic acid components can be used alone or two or more thereof can be used in combination.

From the viewpoint of more enhancing the cracking resistance, the number of carbon atoms in the main chain of the aliphatic dicarboxylic acid is preferably 3 or more, more preferably 4 or more, and preferably 10 or less, more preferably 8 or less.

Examples of the aliphatic dicarboxylic acid compound include fumaric acid, maleic acid, oxalic acid, malonic acid, citraconic acid, itaconic acid, glutaconic acid, succinic acid, adipic acid, suberic acid, azelaic acid, sebacic acid, dodecanedioic acid, and a succinic acid substituted with an alkyl group having 1 or more and 20 or less carbon atoms or an alkenyl group having 2 or more and 20 or less carbon atoms, and anhydrides or alkyl esters (for example, the number of carbon atoms of the alkyl group is 1 or more and 3 or less) thereof. Examples of the substituted succinic acid include dodecylsuccinic acid, dodecenylsuccinic acid, and octenylsuccinic acid. Among the above aliphatic dicarboxylic acid compounds, at least one selected from the group consisting of fumaric acid, maleic acid, and adipic acid is preferred, and adipic acid is more preferred.

Examples of the aromatic dicarboxylic acid compound include phthalic acid, terephthalic acid, isophthalic acid, and naphthalenedicarboxylic acid, and anhydrides or alkyl esters (for example, the number of carbon atoms of the alkyl group is 1 or more and 3 or less) thereof. Among the aromatic dicarboxylic acid compounds, from the viewpoint of achieving rutting resistance, isophthalic acid and terephthalic acid are preferred, and terephthalic acid is more preferred.

The tribasic or higher and hexabasic or lower carboxylic acid is preferably a tribasic carboxylic acid. Examples of the tribasic or higher and hexabasic or lower carboxylic acid include trimellitic acid, 2,5,7-naphthalenetricarboxylic acid, pyromellitic acid, and acid anhydrides thereof. When a polyvalent carboxylic acid is contained, from the viewpoint of controlling properties, a monohydric alcohol may be appropriately contained in the alcohol component, and a monobasic carboxylic acid compound may be appropriately contained in the carboxylic acid component.

When the carboxylic acid component contains an aliphatic dicarboxylic acid compound, from the viewpoints of increasing the flexibility of the polyester to more enhance the rutting resistance, the content of the aliphatic dicarboxylic acid compound in the carboxylic acid component is preferably 1% by mole or more, more preferably 3% by mole or more, further preferably 5% by mole or more, and preferably 15% by mole or less, more preferably 10% by mole or less, in 100% by mole of the carboxylic acid component.

From the viewpoints of enhancing the melt-dispersibility into an asphalt and achieving excellent rutting resistance, the content of the aromatic dicarboxylic acid compound is preferably 60% by mole or more, more preferably 75% by mole or more, and preferably 100% by mole or less, more preferably 99% by mole or less, further preferably 95% by mole or less, furthermore preferably 90% by mole or less, in 100% by mole of the carboxylic acid component.

(Molar Ratio of Carboxylic Acid Component-Derived Structural Unit to Alcohol Component-Derived Structural Unit)

From the viewpoint of controlling the acid value and rutting resistance, a molar ratio of the carboxylic acid component-derived structural unit to the alcohol component-derived structural unit [(carboxylic acid component)/(alcohol component)] is preferably 0.7 or more, and more preferably 0.8 or more, further preferably 0.9 or more, and preferably 1.5 or less, more preferably 1.3 or less, further preferably 1.1 or less.

(Polyethylene Terephthalate-Derived Structural Unit)

The polyester used in the present invention contains a structural unit composed of ethylene glycol and terephthalic acid derived from a polyethylene terephthalate. The polyethylene terephthalate may contain, besides the structural unit composed of ethylene glycol and terephthalic acid, a small amount of butanediol, isophthalic acid, or other components.

In recent years, an influence of waste plastics on the environment has become a problem, and recycling of the waste plastics has been considered. Since polyethylene terephthalate is widely used as a product, such as a bottle or a film, a polyethylene terephthalate that is produced as a product and then discarded and recovered (hereinafter referred to as "recovered PET") is preferably used in the present invention in terms of the environmental issue and the cost. The type and the like of the recovered polyethylene terephthalate is not particularly limited as long as it has a certain level of purity. It may contain a small amount of a plastic, such as polyethylene or polypropylene, as an impurity. For example, a waste pouch container can be used as the recovered PET.

In use of the recovered product, due to the handling and the easiness of dispersion, decomposition, and the like, pulverized flakes, pellets, or the like are suitably used. The specific size of the recovered product used in the present invention is, from the viewpoint of the reaction efficiency, preferably 4 mm$^2$ or more and 15 mm$^2$ or less and the thickness thereof is preferably 3 mm or less.

In the polyester, the molar ratio (B)/(E) of a structural unit (B) derived from the alkylene oxide adduct of bisphenol A to a structural unit (E) composed of ethylene glycol and terephthalic acid derived from the polyethylene terephthalate is, from the viewpoints of the storage stability and the rutting resistance, preferably 30/70 or more, more preferably 50/50 or more, further preferably 60/40 or more, and preferably 95/5 or less, more preferably 90/10 or less, further preferably 80/20 or less.

From the viewpoint of the storage stability and the rutting resistance, the (B)/(E) is preferably 30/70 or more and 95/5 or less, more preferably 50/50 or more and 90/10 or less, further preferably 60/40 or more and 80/20 or less.

The polyester used in the present invention may be a polyester modified to the extent that the characteristics are not substantially impaired. A specific example of the modified polyester is a polyester obtained by grafting or blocking a polyester with phenol, urethane, epoxy, or the like by a method described in JP 11-133668 A, JP 10-239903 A, JP 8-20636 A, or the like. A preferred example of the modified polyester is a urethane-modified polyester obtained by subjecting a polyester to urethane-extension with a polyisocyanate compound.

(Properties of Polyester)

From the viewpoint of achieving the rutting resistance, the softening point of the polyester is preferably 90° C. or higher, more preferably 95° C. or higher, further preferably 100° C. or higher, and preferably 140° C. or lower, more preferably 130° C. or lower, further preferably 125° C. or lower, furthermore preferably 120° C. or lower, furthermore preferably 115° C. or lower.

The acid value of the polyester is, from the viewpoint of promoting adsorption to the aggregate to enhance the rutting resistance, preferably 2 mgKOH/g or more, more preferably 3 mgKOH/g or more, further preferably 5 mgKOH/g or more, and from the viewpoint of increasing water resistance of the paved surface, is preferably 40 mgKOH/g or less, more preferably 30 mgKOH/g or less, further preferably 20 mgKOH/g or less.

From the viewpoint of enhancing the rutting resistance, the hydroxyl value of the polyester is preferably 1 mgKOH/g or more, more preferably 2 mgKOH/g or more, further preferably 5 mgKOH/g or more, furthermore preferably 10 mgKOH/g or more, and preferably 70 mgKOH/g or less, more preferably 50 mgKOH/g or less, further preferably 30 mgKOH/g or less, furthermore preferably 26 mgKOH/g or less.

From the viewpoint of achieving the rutting resistance, the glass transition point of the polyester is preferably 30° C. or higher, more preferably 40° C. or higher, further preferably 50° C. or higher, and preferably 80° C. or lower, more preferably 70° C. or lower, further preferably 65° C. or lower.

The softening point, the acid value, the hydroxyl value, and the glass transition point can be measured by methods described in the section of Examples. The softening point, the acid value, the hydroxyl value, and the glass transition point can be controlled by the raw material monomer composition, molecular weight, catalyst amount, or reaction conditions.

(Method of Producing Polyester)

A method of producing the polyester is not particularly limited, and, for example, the polyester can be produced by subjecting a polyethylene terephthalate, an alcohol component containing an alkylene oxide adduct of bisphenol A, and a carboxylic acid component to polycondensation.

The temperature of the polycondensation reaction is not particularly limited, and from the viewpoint of the reactivity and the viewpoint of the monomer decomposition temperature, the temperature is preferably 210° C. or higher and 260° C. or lower.

The amount of the polyethylene terephthalate present in the raw materials is preferably 4% by mass or more, more preferably 10% by mass or more, further preferably 13% by mass or more, and preferably 80% by mass or less, more preferably 70% by mass or less, further preferably 40% by mass or less, in 100% by mass of the total amount of the polyethylene terephthalate, the alcohol component, and the carboxylic acid component.

The amount of polyethylene terephthalate present in the raw materials is preferably 4% by mass or more and 80% by mass or less, more preferably 10% by mass or more and 70% by mass or less, further preferably 13% by mass or more and 40% by mass or less, in 100% by mass of the total amount of the polyethylene terephthalate, the alcohol component, and the carboxylic acid component.

By adding the polyethylene terephthalate in the polycondensation reaction of the alcohol component and the carboxylic acid component, a transesterification reaction occurs, and a polyester in which a structural unit of polyethylene terephthalate is incorporated in an alcohol component-derived structural unit and a carboxylic acid-derived structural unit can be obtained.

The polyethylene terephthalate may be present at the beginning of the polycondensation reaction or may be added to the reaction system during the polycondensation reaction. From the viewpoint of the rutting resistance, the timing of addition of the polyethylene terephthalate is preferably a stage in which the reaction rate of the alcohol component and the carboxylic acid component is 10% or less, and more preferably a stage in which the reaction rate is 5% or less. Note that the reaction rate refers to a value of [amount of reaction water generated (mol)/theoretical amount of water generated (mol)×100].

From the viewpoint of the reactivity and the cost, a tin(II) compound having no Sn—C bond, such as tin(II) di(2-ethylhexanoate), can be used as an esterification catalyst in the polycondensation reaction. The amount of the esterification catalyst used is preferably 0.01 parts by mass or more, more preferably 0.2 parts by mass or more, and preferably 3.0 parts by mass or less, more preferably 1.5 parts by mass or less, relative to 100 parts by mass of the total amount of the alcohol component, the carboxylic acid component, and the polyethylene terephthalate.

From the viewpoint of the reactivity and the cost, in addition to the catalyst, a pyrogallol compound, such as gallic acid, can be used as an esterification promoter in the polycondensation reaction. The amount of the esterification promoter used is preferably 0.001 parts by mass or more, more preferably 0.005 parts by mass or more, further preferably 0.01 parts by mass or more, and preferably 0.50 parts by mass or less, more preferably 0.20 parts by mass or less, further preferably 0.10 parts by mass or less, relative to 100 parts by mass of the total amount of the alcohol component, the carboxylic acid component, and the polyethylene terephthalate.

(Content of Polyester)

In the asphalt composition of the present invention, from the viewpoint of enhancing the rutting resistance, the content of the polyester relative to 100 parts by mass of the asphalt is preferably 0.5 parts by mass, more preferably 1 parts by mass or more, further preferably 3 parts by mass or more, furthermore preferably 5 parts by mass or more, and preferably 50 parts by mass or less, more preferably 30 parts by mass or less, further preferably 20 parts by mass or less, furthermore preferably 10 parts by mass or less.

In the asphalt composition of the present invention, from the viewpoints of the rutting resistance and the storage stability, the ratio (P)/(A) of the mass proportion (P) of the structural unit of polyethylene terephthalate in the polyester to the asphaltene content (A) in the asphalt is preferably 0.15 or more, more preferably 0.2 or more, more preferably 0.5 or more, more preferably 0.8 or more, and preferably 3.5 or less, more preferably 3 or less, more preferably 2.7 or less.

[Method of Producing Asphalt Composition]

The method of producing an asphalt composition of the present invention preferably includes a step of mixing an asphalt with the polyester described above.

An asphalt composition is obtained by melting an asphalt with heat, adding the polyester thereto, and mixing the mixture by stirring with a generally used mixer until the components are uniformly dispersed. Examples of the generally used mixer include a homomixer, a dissolver, a paddle mixer, a ribbon mixer, a screw mixer, a planetary mixer, a vacuum reverse-flow mixer, a roll mill, and a twin screw extruder.

From the viewpoint of uniformly dispersing the polyester in the asphalt and the viewpoints of the rutting resistance and the storage stability, the temperature in mixing the asphalt and the polyester is preferably 100° C. or higher, more preferably 130° C. or higher, further preferably 160° C. or higher, furthermore preferably 170° C. or higher, and preferably 230° C. or lower, more preferably 210° C. or lower, further preferably 200° C. or lower, furthermore preferably 190° C. or lower.

From the viewpoint of efficiently uniformly dispersing the polyester in the asphalt and the viewpoints of the rutting resistance and the storage stability, the time of mixing the asphalt and the polyester is preferably 0.1 hours or more, more preferably 0.5 hours or more, further preferably 1.0 hour or more, furthermore preferably 1.5 hours or more, and preferably 10 hours or less, more preferably 7 hours or less, further preferably 5 hours or less, furthermore preferably 3 hours or less.

From the viewpoint of the rutting resistance and the storage stability, the ratio (P)/(A) of the mass proportion (P) of the structural unit of polyethylene terephthalate in the polyester to the asphaltene content (A) in the asphalt is preferably 0.15 or more, more preferably 0.2 or more, more preferably 0.5 or more, more preferably 0.8 or more, and preferably 3.5 or less, more preferably 3 or less, more preferably 2.7 or less.

A preferred aspect of the method of producing an asphalt composition includes a step of subjecting a polyethylene terephthalate, an alcohol component containing an alkylene oxide adduct of bisphenol A, and a carboxylic acid component to a polycondensation reaction in the presence of an esterification catalyst to obtain a polyester (Step 1), and a step of mixing an asphalt with the polyester (the polyester obtained in the Step 1) (Step 2).

The polyethylene terephthalate is preferably a recovered polyethylene terephthalate. In this case, the method of producing an asphalt composition preferably includes a step of recovering a polyethylene terephthalate from a product (Step 1a), a step of subjecting the polyethylene terephthalate (the polyethylene terephthalate obtained in the Step 1a), an alcohol component containing an alkylene oxide adduct of bisphenol A, and a carboxylic acid component to a polycondensation reaction in the presence of an esterification catalyst to obtain a polyester (Step 2a), and a step of mixing an asphalt with the polyester (the polyester obtained in the Step 2a) (Step 3a).

[Dispersant]

The asphalt composition may contain a dispersant.

The dispersant is preferably a dispersant soluble in an asphalt and having affinity with the polyester.

Examples of the dispersant include a polymer dispersant and a surfactant, such as a polyoxyethylene alkylamine and an alkanolamine.

Examples of the polymer dispersant include a polyamide amine and a salt thereof, a polycarboxylic acid and a salt thereof, a high-molecular weight unsaturated acid ester, a modified polyurethane, a modified polyester, a modified poly(meth)acrylate, a (meth)acrylic copolymer, and a naphthalenesulfonic acid formalin condensate. These dispersants may be used alone or in combination of two or more thereof.

From the viewpoint of enhancing the high-temperature storage stability, the dispersant is preferably a polymer dispersant. The "polymer dispersant", as used in the present invention, means a dispersant having a weight average molecular weight of 1,000 or more. Although the weight average molecular weight also depends on the polymer species, it is preferably 2,000 or more, more preferably 4,000 or more, and preferably 80,000 or less, more preferably 40,000 or less.

The dispersant preferably has a basic functional group. The basic functional group means a group such that a pKa of the conjugate acid is −3 or more. Examples of the basic functional group include an amino group, an imino group, and a quaternary ammonium group From the viewpoint of the high temperature storage stability, the base value of the dispersant is preferably 10 mgKOH/g or more, more preferably 20 mgKOH/g or more, further preferably 30 mgKOH/g or more, and preferably 150 mgKOH/g or less, more preferably 120 mgKOH/g or less, further preferably 100 mgKOH/g or less. The base value is measured by the method prescribed in JIS K7237:1995.

Examples of a commercially available dispersant include "DISPER" Series "byk-101", "byk-130", "byk-161", "byk-162", "byk-170", "byk-2020", "byk-2164", and "byk-LPN21324" (all of which are manufactured by BYK Additives & Instruments; "SOLSPERSE" Series "9000", "11200", "13240", "13650", "13940", "17000", "18000", "24000", "28000", "32000", "38500", and "71000" (all of which are manufactured by Lubrizol Corp.); "AJISPER" Series "PB821", "PB822", "PB880", and "PB881" (all of which are manufactured by Ajinomoto Fine-Techno Co., Inc.); "EFKA" Series "46", "47", "48", "49", "4010", "4047", "4050", "4165", and "5010" (all of which are manufactured by BASF SE); "FLOWLEN TG-710" (manufactured by Kyoeisha Chemical Co., Ltd.); and "TAMN-15" (manufactured by Nikko Chemicals Co., Ltd.).

From the viewpoint of the high temperature storage stability, the content of the dispersant is preferably 1 part by mass or more, more preferably 3 parts by mass or more, further preferably 4 parts by mass or more, and preferably 80 parts by mass or less, more preferably 60 parts by mass or less, further preferably 40 parts by mass or less, furthermore preferably 30 parts by mass or less, furthermore preferably 20 parts by mass or less, relative to 100 parts by mass of the polyester.

[Asphalt Mixture]

The asphalt composition of the present invention is a binder composition, and is used for pavement after an aggregate is added to the asphalt composition to prepare an asphalt mixture. In other word, the asphalt composition of the present invention is suitable for pavement, in particular, for pavement of a road.

The asphalt mixture of the present invention contains the asphalt composition described above and an aggregate. That is, the asphalt mixture contains an asphalt, a polyester, and an aggregate, and preferably contains an asphalt, a thermoplastic elastomer, a polyester, and an aggregate.

From the viewpoint of enhancing the rutting resistance, the content of the asphalt composition in the asphalt mixture is preferably 2% by mass or more, more preferably 3% by mass or more, further preferably 4% by mass or more, and preferably 15% by mass or less, more preferably 10% by mass or less, further preferably 8% by mass or less, in 100% by mass of the asphalt mixture.

(Aggregate)

As the aggregate, for example, any of crushed stone, cobble stone, gravel, sand, recycled aggregate, ceramic, and the like can be selected and used. As the aggregate, any of a coarse aggregate having a particle diameter of 2.36 mm or more and a fine aggregate having a particle diameter of less than 2.36 mm can be used.

Examples of the coarse aggregate include crushed stone having a particle diameter range of 2.36 mm or more and 4.75 mm or less, crushed stone having a particle diameter range of 4.75 mm or more and 12.5 mm or less, crushed stone having a particle diameter range of 12.5 mm or more and 19 mm or less, and crushed stone having a particle diameter range of 19 mm or more and 31.5 mm or less.

The fine aggregate is preferably a fine aggregate having a particle diameter of 0.075 mm or more and less than 2.36 mm. Examples of the fine aggregate include river sand, hill sand, mountain sand, sea sand, crushed sand, fine sand, screenings, crushed stone dust, silica sand, artificial sand, glass cullet, molding sand, and recycled aggregate-crushed sand.

The aforementioned particle diameter is a value prescribed in JIS 5001:1995.

Among them, a combination of the coarse aggregate and the fine aggregate is preferred.

The fine aggregate may contain a filler having a particle diameter of less than 0.075 mm (for example, sand). Examples of the filler include sand, fly ash, calcium carbonate, and hydrated lime. Among them, from the viewpoint of enhancing the dry strength, calcium carbonate is preferred.

From the viewpoint of enhancing the dry strength, the average particle diameter of the filler is preferably 0.001 mm or more, and preferably 0.05 mm or less, more preferably 0.03 mm or less, further preferably 0.02 mm or less. The average particle diameter of the filler can be measured by a laser diffraction particle size distribution analyzer. Here, the average particle diameter means an average particle diameter of 50% cumulative volume.

[Method of Measuring Average Particle Diameter of Filler]

The average particle diameter of the filler is a value measured using a laser diffraction particle size distribution analyzer (LA-950, manufactured by HORIBA, Ltd.) under the following conditions.

Measurement method: flow method
Dispersion medium: ethanol
Sample preparation: 2 mg/100 mL
Dispersing method: stirring, 1 minute under built-in ultrasonic waves From the viewpoint of the rutting resistance, a mass ratio of the coarse aggregate to the fine aggregate is preferably 10/90 or more, more preferably 20/80 or more, further preferably 30/70 or more, and preferably 90/10 or less, more preferably 80/20 or less, further preferably 70/30 or less.

From the viewpoint of the rutting resistance, the content of the aggregate is preferably 1,000 parts by mass or more, more preferably 1,200 parts by mass or more, further preferably 1,400 parts by mass or more, and preferably 3,000 parts by mass or less, more preferably 2,500 parts by mass or less, and further preferably 2,000 parts by mass or less, relative to 100 parts by mass of the asphalt composition.

Suitable examples of blending in the asphalt mixture are as follows.

(1) An example of the asphalt mixture contains, for example, 30% by volume or more and less than 45% by volume of the coarse aggregate, 30% by volume or more and 50% by volume or less of the fine aggregate, and 5% by volume or more and 10% by volume or less of the asphalt composition (fine-graded asphalt).

(2) An example of the asphalt mixture contains, for example, 45% by volume or more and less than 70% by volume of the coarse aggregate, 20% by volume or more and 45% by volume or less of the fine aggregate, and 3% by volume or more and 10% by volume or less of the asphalt composition (dense-graded asphalt).

(3) An example of the asphalt mixture contains, for example, 70% by volume or more and 80% by volume or less of the coarse aggregate, 10% by volume or more and 20% by volume or less of the fine aggregate, and 3% by volume or more and 10% by volume or less of the asphalt composition (porous asphalt).

In the asphalt mixture, other components may be further blended, as the need arises.

In a conventional asphalt mixture containing an aggregate and an asphalt, a blending proportion of the asphalt is generally adopted according to an optimum asphalt amount obtained from "Formulation and Design of Asphalt Composition" as described in "Guideline for Pavement Design and Construction" published by Japan Road Association.

In the present invention, the aforementioned optimum asphalt amount corresponds to the total amount of the asphalt, the thermoplastic elastomer, and the polyester. Accordingly, in general, the aforementioned optimum asphalt amount is preferably adopted as the total amount of the asphalt, the thermoplastic elastomer, and the polyester blended.

However, the method of determining the amount is not to be limited to the method as described in "Guideline for Pavement Design and Construction", and the amount may also be determined by any other methods.

[Method of Producing Asphalt Mixture]

The method of producing an asphalt mixture of the present invention includes a step of subjecting a polyethylene terephthalate, an alcohol component containing an alkylene oxide adduct of bisphenol A, and an carboxylic acid component to a polycondensation reaction in the presence of an esterification catalyst to obtain a polyester (Step 1), and mixing a heated aggregate, an asphalt, and the polyester (the polyester obtained in the Step 1) (Step 2), and preferably includes a step of mixing a heated aggregate, an asphalt, a thermoplastic elastomer, and the polyester.

Specific examples of a method of producing an asphalt mixture include conventional methods of producing an asphalt mixture called a plant mix method, a premix method, and the like. The methods are all a method in which an asphalt (and a thermoplastic elastomer as needed), and a polyester are added to a heated aggregate. Examples of the addition method include a premix method in which an asphalt (and a thermoplastic elastomer as needed), and a polyester are previously dissolved; and a plant mix method in which a modified asphalt having a thermoplastic elastomer dissolved in an asphalt is added, and then, a polyester is put therein. Among them, the premix method is preferred from the viewpoint of the rutting resistance.

More specifically, in the mixing step of the method of producing an asphalt mixture, preferably (i) the asphalt (and the thermoplastic elastomer as needed) are added to and mixed with the heated aggregate, and then, the polyester is added and mixed;

(ii) the asphalt (and the thermoplastic elastomer as needed) and the polyester are simultaneously added to and mixed with the heated aggregate; or (iii) a mixture of the asphalt (and the thermoplastic elastomer as needed) and the polyester previously mixed with heat is added to and mixed with the heated aggregate.

Among them, a method of (iii) is preferred from the viewpoint of the rutting resistance.

The temperature in previously mixing the asphalt and the polyester in the method of (iii) is, from the viewpoint of the rutting resistance, preferably a temperature higher than the softening point of the polyester, preferably 130° C. or higher, more preferably 150° C. or higher, further preferably 170° C. or higher, furthermore preferably 180° C. or higher, and from the viewpoint of preventing thermal degradation of the asphalt, preferably 230° C. or lower, more preferably 210° C. or lower, further preferably 200° C. or lower. The time of mixing is, for example, 10 minutes or more, preferably 30 minutes or more, more preferably 1 hour or more, more preferably 2 hours or more. The upper limit of the time is not particularly limited, and, for example, is about 5 hours.

The temperature of the heated aggregate in the methods of (i) to (iii) is, from the viewpoint of the rutting resistance, a temperature higher than the softening point of the polyester, preferably 130° C. or higher, more preferably 150° C. or higher, further preferably 170° C. or higher, furthermore preferably 180° C. or higher, and from the viewpoint of preventing thermal decomposition of the asphalt, preferably 230° C. or lower, more preferably 210° C. or lower, further preferably 200° C. or lower.

In the step of mixing, from the viewpoint of the rutting resistance, the temperature of mixing is preferably a temperature higher than the softening point of the polyester, preferably 130° C. or higher, more preferably 150° C. or higher, further preferably 170° C. or higher, furthermore preferably 180° C. or higher, and from the viewpoint of preventing thermal decomposition of the asphalt, preferably 230° C. or lower, more preferably 210° C. or lower, further preferably 200° C. or lower. The time of mixing in the step of mixing is, for example, 30 seconds or more, preferably 1 minute or more, more preferably 2 minutes or more, further preferably 5 minutes or more. The upper limit of the time is not particularly limited, and, for example, is about 30 minutes.

From the viewpoint of enhancing the rutting resistance, the method of producing an asphalt mixture preferably includes, after the step of mixing, a step of keeping the obtained mixture at a temperature higher than the softening point of the polyester or higher.

In the step of keeping, the mixture may be further mixed as long as the above-mentioned temperature or higher is kept.

In the step of keeping, the temperature of mixing is preferably a temperature higher than the softening point of the polyester, preferably 130° C. or higher, more preferably 150° C. or higher, further preferably 170° C. or higher, furthermore preferably 180° C. or higher, and from the viewpoint of preventing thermal decomposition of the asphalt composition, is preferably 230° C. or lower, more preferably 210° C. or lower, further preferably 200° C. or lower. The time of keeping in the step of keeping is preferably 0.5 hours or more, more preferably 1 hour or more, further preferably 1.5 hours or more. The upper limit of the time is not particularly limited, and is, for example, about 5 hours.

The polyethylene terephthalate is preferably a recovered polyethylene terephthalate. In this case, the method of producing an asphalt mixture includes a step of recovering a polyethylene terephthalate from a product (Step 1a), subjecting the polyethylene terephthalate (the polyethylene terephthalate obtained in the Step 1a), an alcohol component containing an alkylene oxide adduct of bisphenol A, and a carboxylic acid component to a polycondensation reaction in the presence of an esterification catalyst to obtain a polyester (Step 2a), and a step of mixing a heated aggregate, an asphalt, and the polyester (the polyester obtained in the Step 2a) (Step 3a).

[Road Pavement Method]

The asphalt mixture of the present invention is suitable for paving a road, and as described above, an asphalt mixture in which an aggregate is added to the asphalt composition is used for paving a road.

The method of paving a road preferably includes laying the asphalt mixture on a road to form an asphalt pavement material layer. Specifically, the method of paving a road includes a step of mixing an asphalt, the polyester, and an aggregate to obtain an asphalt mixture (Step 1), and a step of laying the asphalt mixture obtained in the Step 1 on a road to form an asphalt pavement material layer (Step 2). The asphalt pavement material layer is preferably a base course or a surface course.

The asphalt mixture may be subjected to compaction laying by such a method using a known laying machine. In the case of using a heated asphalt mixture, from the viewpoint of the rutting resistance, a compaction temperature thereof is preferably a temperature higher than the softening point of the polyester, preferably 100° C. or higher, more preferably 120° C. or higher, further preferably 130° C. or higher, and preferably 200° C. or lower, more preferably 180° C. or lower.

The present invention further discloses the following <1> to <7>.

<1> An asphalt composition containing an asphalt and a polyester, the polyester being a polycondensate of a polyethylene terephthalate, an alcohol, and a carboxylic acid compound, the alcohol containing an alkylene oxide adduct of bisphenol A.

<2> The asphalt composition according to the above <1>, wherein the polyester has a molar ratio (B)/(E) of a structural unit (B) derived from the alkylene oxide adduct of bisphenol A to a structural unit (E) composed of ethylene glycol and terephthalic acid derived from the polyethylene terephthalate of 30/70 or more and 95/5 or less, and the polyester has an acid value of 2 mgKOH/g or more and 40 mgKOH/g or less.

<3> The asphalt composition according to the above <1>, wherein the molar ratio (B)/(E) of the structural unit (B) derived from the alkylene oxide adduct of bisphenol A to the structural unit (E) composed of ethylene glycol and terephthalic acid derived from the polyethylene terephthalate in the polyester is 50/50 or more and 95/5 or less, and the acid value of the polyester is 2 mgKOH/g or more and 40 mgKOH/g or less.

<4> The asphalt composition according to the above <1>, wherein the molar ratio (B)/(E) of the structural unit (B) derived from the alkylene oxide adduct of bisphenol A to the structural unit (E) composed of ethylene glycol and terephthalic acid derived from the polyethylene terephthalate in the polyester is 30/70 or more and 80/20 or less, and the acid value of the polyester is 2 mgKOH/g or more and 40 mgKOH/g or less.

<5> The asphalt composition according to the above <1>, wherein the molar ratio (B)/(E) of the structural unit (B) derived from the alkylene oxide adduct of bisphenol A to the structural unit (E) composed of ethylene glycol and terephthalic acid derived from the polyethylene terephthalate in the polyester is 30/70 or more and 95/5 or less, and the acid value of the polyester is 5 mgKOH/g or more and 40 mgKOH/g or less.

<6> The asphalt composition according to the above <1>, wherein the molar ratio (B)/(E) of the structural unit (B) derived from the alkylene oxide adduct of bisphenol A to the structural unit (E) composed of ethylene glycol and terephthalic acid derived from the polyethylene terephthalate in the polyester is 30/70 or more and 95/5 or less, and the acid value of the polyester is 2 mgKOH/g or more and 30 mgKOH/g or less.

<7> The asphalt composition according to the above <1>, wherein the molar ratio (B)/(E) of the structural unit (B) derived from the alkylene oxide adduct of bisphenol A to the structural unit (E) composed of ethylene glycol and terephthalic acid derived from the polyethylene terephthalate in the polyester is 60/40 or more and 80/20 or less, and the acid value of the polyester is 5 mgKOH/g or more and 20 mgKOH/g or less.

EXAMPLES

Property values of resins and the like were measured and evaluated by the following methods.

[Measurement Methods]

[Acid Value and Hydroxyl Value of Polyester]

An acid value and a hydroxyl value of a polyester were each measured on the basis of the method of JIS K0070: 1992. However, only the measuring solvent was changed from the mixed solvent of ethanol and ether as prescribed in JIS K0070:1992 to a mixed solvent of acetone and toluene (acetone/toluene =1/1 (volume ratio)).

[Softening Point and Glass Transition Point of Polyester]

(1) Softening Point

Using a flow tester "CFT-500D" (manufactured by Shimadzu Corporation), while heating 1 g of a sample at a temperature rise rate of 6° C./min, a load of 1.96 MPa was applied with a plunger, and the sample was extruded through a nozzle having a diameter of 1 mm and a length of 1 mm. The amount of descent of the plunger of the flow tester versus the temperature was plotted, and a temperature at which a half amount of the sample flowed out was taken as the softening point of the sample.

(2) Glass Transition Point

Using a differential scanning calorimeter "Q-100" (manufactured by TA Instruments Japan Inc.), 0.01 to 0.02 g of a sample was weighed in an aluminum pan, the sample was heated to 200° C., and then was cooled from that temperature to 0° C. at a temperature drop rate of 10° C./min. Subsequently, the measurement was performed while raising the temperature to 150° C. at a temperature rise rate of 10° C./min. A temperature at which an extension of a baseline in a region of the maximum endothermic peak temperature or lower was intersected with a tangential line having a maximum inclination of the curve in a region of from a rise-up portion of the peak to an apex of the peak was read as the glass transition point of the sample.

Production Examples 1 to 6

(Production of Polyester Resins (A1) to (A4) and (a1) to (a2))

The alcohol components, carboxylic acid component, and PET in the polyester of Table 1 were put in a 5-liter four-neck flask equipped with a thermometer, a stainless-steel stirrer bar, a flow-down condenser, and a nitrogen introducing tube, and tin(II) di(2-ethylhexanoate) and gallic acid in amounts shown in Table 1 were added under nitrogen atmosphere. The mixture was heated to 235° C. over 3 hours in a mantle heater, and was then kept at 235° C. for 5 hours. After visually confirming disappearance of PET granules from the reaction product, a reaction under reduced pressure was performed at 8.0 kPa, and the reaction was continued until the softening point shown in Table 1 was reached, whereby intended polyester resins (A1) to (A4) and (a1) to (a2) were obtained.

TABLE 1

| | | | Production Example | | | | | |
|---|---|---|---|---|---|---|---|---|
| | | | 1 A1 | | 2 A2 | | 3 A3 | |
| | Resin | | Charged amount (g) | Molar ratio | Charged amount (g) | Molar ratio | Charged amount (g) | Molar ratio |
| Raw material monomers | Alcohol component | BPA-PO *1 | 1750 | 50 | 1000 | 20 | 2042 | 70 |
| | | BPA-EO *2 | 650 | 20 | 929 | 20 | 542 | 20 |
| | | Ethylene glycol | — | — | — | — | — | — |
| | | Triethylene glycol | — | — | — | — | — | — |
| | Carboxylic acid component | Terephthalic acid | 1079 | 65 | 830 | 35 | 1176 | 85 |
| | PET *3 | PET1 *4 | 576 | 30 | 1646 | 60 | 160 | 10 |
| | | Weight ratio of PET (%) *5 | 14 | | 37 | | 4.1 | |
| Esterification catalyst | | Tin(II) di(2-ethylhexanoate) | 20 g | | 20 g | | 20 g | |
| Promoter | | Gallic acid | 2 g | | 2 g | | 2 g | |
| Properties | | Softening point (° C.) | 105.2 | | 103.5 | | 104.8 | |
| | | Glass transition point (° C.) | 60.4 | | 57.3 | | 63.1 | |
| | | Acid value (mgKOH/g) | 7.9 | | 8.6 | | 6.9 | |
| | | Hydroxyl value (mgKOH/g) | 25.6 | | 24.3 | | 28.3 | |

| | | | Production Example | | | | | |
|---|---|---|---|---|---|---|---|---|
| | | | 4 A4 | | 5 a1 | | 6 a2 | |
| | Resin | | Charged amount (g) | Molar ratio | Charged amount (g) | Molar ratio | Charged amount (g) | Molar ratio |
| Raw material monomers | Alcohol component | BPA-PO *1 | 500 | 10 | 1750 | 50 | — | — |
| | | BPA-EO *2 | 929 | 20 | 650 | 20 | — | — |
| | | Ethylene glycol | — | — | 186 | 30 | — | — |
| | | Triethylene glycol | — | — | — | — | 1050 | 70 |
| | Carboxylic acid component | Terephthalic acid | 593 | 25 | 1577 | 95 | 1079 | 65 |
| | PET *3 | PET1 *4 | 1920 | 70 | — | — | 576 | 30 |
| | | Weight ratio of PET (%) *5 | 49 | | 0 | | 21 | |
| Esterification catalyst | | Tin(II) di(2-ethylhexanoate) | 20 g | | 20 g | | 13 g | |
| Promoter | | Gallic acid | 2 g | | 2 g | | 1 g | |
| Properties | | Softening point (° C.) | 104.0 | | 105.6 | | 100.3 | |
| | | Glass transition point (° C.) | 56.4 | | 60.8 | | 52.1 | |
| | | Acid value (mgKOH/g) | 8.1 | | 7.1 | | 7.2 | |
| | | Hydroxyl value (mgKOH/g) | 25.4 | | 24.8 | | 30.5 | |

*1: BPA-PO: polyoxypropylene (2.2) adduct of bisphenol A
*2: BPA-EO: polyoxyethylene (2.2) adduct of bisphenol A
*3: Calculated with a (terephthalic acid-ethylene glycol) unit taken as 1 mole
*4: PET1: RAMAPET L1 (manufactured by Indorama Ventures)
*5: Weight proportion of PET in the total amount of PET, alcohol component, and carboxylic acid component Example 1

As a binder mixture, 2200 g of a modified asphalt type II (manufactured by TOA ROAD CORPORATION, asphaltene concentration in asphalt: 15% by mass) heated to 180° C. was put in a 3 L stainless steel container, and the asphalt was stirred at 100 rpm. Then, 110 g (5 parts by mass relative to 100 parts by mass of the asphalt) of a polyester resin (A1) was gradually added thereto, and the mixture was stirred at 300 rpm for 2 hours, thereby producing an asphalt composition (AS-1).

Next, 11 kg of an aggregate (the composition of the aggregate was shown below) heated to 180° C. was put in an asphalt mixer, and was mixed at 180° C. for 60 seconds.

Next, 635 g of the asphalt composition (AS-1) was added, and was mixed with an asphalt mixer for 2 minutes. The obtained asphalt mixture was stored at 180° C. for 2 hours, and then was filled in a mold of 300×300×50 mm. With a roller compactor (manufactured by Iwata Kogyosho K. K.), a pressure treatment of 25 rotations was applied at a temperature of 150° C. and a load of 0.44 kPa, thereby producing an asphalt mixture (M-1) as a specimen.

<Composition of Aggregate>

| | |
|---|---|
| Crushed stones No. 6 | 50.9 parts by mass |
| Crushed sand 1 | 10.4 parts by mass |
| Crushed sand 2 | 22.1 parts by mass |
| Fine sand | 10.4 parts by mass |
| Stone dust | 6.2 parts by mass |

Passing % by mass:

Sieve opening 15 mm: 100% by mass

Sieve opening 10 mm: 85.6% by mass

Sieve opening 5 mm: 49.7% by mass

Sieve opening 2.5 mm: 44.6% by mass

Sieve opening 1.2 mm: 31.6% by mass

Sieve opening 0.6 mm: 21.3% by mass

Sieve opening 0.3 mm: 12.7% by mass

Sieve opening 0.15 mm: 7.1% by mass

Examples 2 to 4

Asphalt compositions (AS-2) to (AS-4) were produced in the same manner as in Example 1 except for changing the polyester resin (A1) in Example 1 to polyester resins (A2) to (A4), respectively.

Asphalt mixtures (M-2) to (M-4) were obtained as a specimen in the same manner as in Example 1 except for changing 635 g of the asphalt composition (AS-1) in Example 1 to 635 g of asphalt compositions (AS-2) to (AS-4), respectively.

Example 5

An asphalt composition (AS-5) was obtained in the same manner as in Example 1 except for changing the amount of the polyester resin (A1) added in Example 1 to 550 g (25 parts by mass relative to 100 parts by mass of the asphalt).

An asphalt mixture (M-5) was obtained as a specimen in the same manner as in Example 1 except for changing 635 g of the asphalt composition (AS-1) in Example 1 to 756 g of the asphalt composition (AS-5).

Example 6

An asphalt composition (AS-6) was obtained in the same manner as in Example 1 except for changing the asphalt in Example 1 to a straight asphalt (manufactured by TOA ROAD CORPORATION, asphaltene concentration in asphalt: 15% by mass).

An asphalt mixture (M-6) was obtained as a specimen in the same manner as in Example 1 except for changing 635 g of the asphalt composition (AS-1) in Example 1 to 635 g of the asphalt composition (AS-6).

Example 7

An asphalt composition (AS-7) was obtained in the same manner as in Example 1 except for changing the asphalt in Example 1 to a modified asphalt "PG76-22" (manufactured by Ergon, Inc. in Texas, US, asphaltene concentration in asphalt: 22% by mass).

An asphalt mixture (M-7) was obtained as a specimen in the same manner as in Example 1 except for changing 635 g of the asphalt composition (AS-1) in Example 1 to 635 g of the asphalt composition (AS-7).

Example 8

An asphalt composition (AS-8) was obtained in the same manner as in Example 1 except for changing the asphalt in Example 1 to a modified asphalt (manufactured by FESPA in Mexico, asphaltene concentration in asphalt: 28% by mass).

An asphalt mixture (M-8) was obtained as a specimen in the same manner as in Example 1 except for changing 635 g of the asphalt composition (AS-1) in Example 1 to 635 g of the asphalt composition (AS-8).

Example 9

An asphalt mixture (M-9) was obtained as a specimen in the same manner as in Example 1 except for changing 635 g of the asphalt composition (AS-1) in Example 1 to 716 g of the asphalt composition (AS-1).

Example 10

An asphalt mixture (M-10) was obtained as a specimen in the same manner as in Example 1 except for changing 635 g of the asphalt composition (AS-1) in Example 1 to 520 g of the asphalt composition (AS-1).

Comparative Example 1

In Example 1, the modified asphalt type II was used as it was without adding the polyester resin (A1).

An asphalt mixture (M-A) was obtained as a specimen in the same manner as in Example 1 except for changing 635 g of the asphalt composition (AS-1) in Example 1 to 605 g of the modified asphalt type II.

Comparative Examples 2 to 3

Asphalt compositions (AS-a1) to (AS-a2) were obtained in the same manner as in Example 1 except for changing the polyester resin (A1) in Example 1 to the polyester resins (a1) to (a2), respectively.

Asphalt mixtures (M-a1) to (M-a2) were obtained as a specimen in the same manner as in Example 1 except for changing 635 g of the asphalt composition (AS-1) in Example 1 to 635 g of asphalt compositions (AS-a1) to (AS-a2), respectively.

Comparative Example 4

An asphalt composition (AS-a3) was produced in the same manner as in Example 1 except for changing the polyester resin (A1) in Example 1 to PET 1 ("RAMAPET L1", manufactured by Indorama Ventures).

An asphalt mixture (M-a3) was obtained as a specimen in the same manner as in Example 1 except for changing 635 g of the asphalt composition (AS-1) in Example 1 to 635 g of the asphalt composition (AS-a3).

[Evaluation]
[Rutting Resistance]

The specimen was immersed in hot water set at 60° C. in a thermostatic chamber of 60° C., and a wheel was reciprocated on the specimen using a wheel tracking tester (manufactured by Iwata Kogyosho K. K., load: 1370 N, frettage width: 47 mm, linear load: 291.5 N/cm) at a speed of 15 rpm, and the displacements after 1,250 passings and 2,500 passings were measured. Other measurement conditions were according to "B003 Wheel Tracking Test" described in "Handbook for Method of Assessment and Test for Pavement" published by Japan Road Association.

In Examples 1 to 5, 7 to 10 and Comparative Examples 1 to 4 in which a modified asphalt was used, hot water set at 60° C. was allowed to infiltrate into the specimen in a thermostatic chamber of 60° C., and the displacement after 2,500 tire passings was measured. In Example 6 in which a straight asphalt was used, hot water set at 50° C. was allowed to infiltrate into the specimen in a thermostatic chamber of 50° C., and the displacement after 1,250 tire passings was measured. The results are shown in Table 2.

[Storage Stability of Asphalt Composition]

Into a sample bottle (inner diameter 3.5 cm×height 7.8 cm), 50 mL of an asphalt composition was poured and was stored in a 180° C. oven for 4 hours. Then, a height of precipitation of the polyester in the asphalt composition was measured. The percentage of the height of the precipitation generated based on the height of precipitation to be generated if all the polyester in the asphalt had precipitated was calculated and was taken as a measure of the storage stability. A lower value means a smaller amount of precipitation and a better storage stability.

In Comparative Example 1 in which the polyester is not blended, the measurement was not performed since no precipitation of a polyester was to be generated. In the table, it was indicated as "-".

In Comparative Example 2 in which a structural unit composed of ethylene glycol and terephthalic acid derived from polyethylene terephthalate is not contained, although rutting can be suppressed, the storage stability of the asphalt at a high temperature is poor. On the other hand, in Comparative Example 4 in which polyethylene terephthalate was blended as it was and Comparative Example 3 in which a structural unit derived from an alkylene oxide adduct of bisphenol A was not contained, rutting cannot be sufficiently suppressed.

In contrast, it can be seen that, according to the present invention, an asphalt composition containing a specific polyester having a structural unit composed of ethylene glycol and terephthalic acid derived from polyethylene terephthalate and a structural unit derived from an alkylene oxide adduct of bisphenol A is excellent in the storage stability and rutting of a paved surface after laying can be further suppressed.

TABLE 2

| Asphalt mixture | Amount of aggregate blended (g) | Amount of asphalt composition blended (g) | Asphalt composition | Asphalt | Asphaltene content (A) (% by mass) | Polyester | Polyester content (parts by mass) *1 | P/A *2 | Rutting resistance (mm) | Storage stability (stored at 180° C. for 4 hours) (%) *3 |
|---|---|---|---|---|---|---|---|---|---|---|
| Example 1 | M-1 | 11000 | 635 | AS-1 | A | 15 | A1 | 5 | 0.93 | 2.5 | 15 |
| Example 2 | M-2 | 11000 | 635 | AS-2 | A | 15 | A2 | 5 | 2.47 | 4.1 | 16 |
| Example 3 | M-3 | 11000 | 635 | AS-3 | A | 15 | A3 | 5 | 0.27 | 2.6 | 38 |
| Example 4 | M-4 | 11000 | 635 | AS-4 | A | 15 | A4 | 5 | 3.27 | 4.9 | 35 |
| Example 5 | M-5 | 11000 | 756 | AS-5 | A | 15 | A1 | 25 | 0.93 | 2.6 | 30 |
| Example 6 | M-6 | 11000 | 635 | AS-6 | B | 15 | A1 | 5 | 0.93 | 4.8 | 20 |
| Example 7 | M-7 | 11000 | 635 | AS-7 | C | 22 | A1 | 5 | 0.64 | 2.6 | 16 |
| Example 8 | M-8 | 11000 | 635 | AS-8 | D | 28 | A3 | 5 | 0.15 | 4.5 | 53 |
| Example 9 | M-9 | 11000 | 716 | AS-1 | A | 15 | A1 | 5 | 0.93 | 3.1 | 20 |
| Example 10 | M-10 | 11000 | 520 | AS-1 | A | 15 | A1 | 5 | 0.93 | 2.7 | 25 |
| Comparative Example 1 | M-A | 11000 | 605 | A | A | 15 | — | — | 0 | 16.5 | — |
| Comparative Example 2 | M-a1 | 11000 | 635 | AS-a1 | A | 15 | a1 | 5 | 0 | 5.8 | 87 |
| Comparative Example 3 | M-a2 | 11000 | 635 | AS-a2 | A | 15 | a2 | 5 | 1.40 | 14.2 | 30 |
| Comparative Example 4 | M-a3 | 11000 | 635 | AS-a3 | A | 15 | PET1 | 5 | 6.67 | 13.2 | 60 |

Asphalt A: modified asphalt type II (manufactured by TOA ROAD CORPORATION, asphaltene concentration in asphalt: 15% by mass)
Asphalt B: straight asphalt (manufactured by TOA ROAD CORPORATION, asphaltene concentration in asphalt: 15% by mass)
Asphalt C: modified asphalt "PG76-22" (manufactured by Ergon in Texas, asphaltene concentration in asphalt: 22% by mass)
Asphalt D: modified asphalt (manufactured by FESPA in Mexico, asphaltene concentration in asphalt: 28% by mass)
*1: Content of polyester relative to 100 parts by mass of asphalt (parts by mass)
*2: P/A = ratio of mass proportion (P) of polyethylene terephthalate in polyester to asphaltene content (A) in asphalt
*3: Ratio of the precipitation to 100% of precipitation to be generated if all the polyester had precipitated

The invention claimed is:

1. An asphalt composition comprising an asphalt and a polyester,
the polyester being a polycondensate of a polyethylene terephthalate, an alcohol, and a carboxylic acid compound, the alcohol containing an alkylene oxide adduct of bisphenol A,
wherein:
the polyester has a molar ratio (B)/(E) of a structural unit (B) derived from the alkylene oxide adduct of bisphenol A and a structural unit (E) composed of ethylene glycol and terephthalic acid derived from the polyethylene terephthalate of 30/70 or more and 95/5 or less, and
the asphalt composition has a ratio (P)/(A) of a mass proportion (P) of the structural unit derived from the polyethylene terephthalate in the polyester to an asphaltene content (A) in the asphalt of 0.15 or more and 3.5 or less.

2. The asphalt composition according to claim 1, wherein the polyester is contained in an amount of 0.5 parts by mass or more and 50 parts by mass or less relative to 100 parts by mass of the asphalt.

3. The asphalt composition according to claim 1, wherein the polyethylene terephthalate is a recovered polyethylene terephthalate.

4. The asphalt composition according to claim 1, wherein the polyester has an acid value of 2 mgKOH/g or more and 40 mgKOH/g or less.

5. The asphalt composition according to claim 1, further comprising a thermoplastic elastomer.

6. The asphalt composition according to claim 5, wherein the thermoplastic elastomer is at least one selected from the group consisting of a styrene/butadiene block copolymer, a styrene/butadiene/styrene block copolymer, a styrene/butadiene random copolymer, a styrene/isoprene block copolymer, a styrene/isoprene/styrene block copolymer, a styrene/isoprene random copolymer, an ethylene/vinyl acetate copolymer, and an ethylene/acrylic acid ester copolymer.

7. A method of producing an asphalt composition, the method comprising
Step 1: a step of subjecting a polyethylene terephthalate, an alcohol component containing an alkylene oxide adduct of bisphenol A, and a carboxylic acid component to a polycondensation reaction in the presence of an esterification catalyst to obtain a polyester,
wherein the polyester has a molar ratio (B)/(E) of a structural unit (B) derived from the alkylene oxide adduct of bisphenol A and a structural unit (E) composed of ethylene glycol and terephthalic acid derived from the polyethylene terephthalate of 30/70 or more and 95/5 or less, and Step 2: a step of mixing an asphalt with the polyester obtained in the Step 1, to obtain an asphalt composition having a ratio (P)/(A) of a mass proportion (P) of the structural unit derived from the polyethylene terephthalate in the polyester to an asphaltene content (A) in the asphalt of 0.15 or more and 3.5 or less.

8. The method of producing an asphalt composition according to claim 7, wherein the polyethylene terephthalate is a recovered polyethylene terephthalate.

9. An asphalt mixture comprising the asphalt composition according to claim 1 and an aggregate.

10. A method of producing an asphalt mixture, the method comprising

Step 1: a step of subjecting a polyethylene terephthalate, an alcohol component containing an alkylene oxide adduct of bisphenol A, and a carboxylic acid component to a polycondensation reaction in the presence of an esterification catalyst to obtain a polyester, wherein the polyester has a molar ratio (B)/(E) of a structural unit (B) derived from the alkylene oxide adduct of bisphenol A and a structural unit (E) composed of ethylene glycol and terephthalic acid derived from the polyethylene terephthalate of 30/70 or more and 95/5 or less, and Step 2: a step of mixing a heated aggregate, an asphalt, and the polyester obtained in the Step 1, to obtain an asphalt mixture having a ratio (P)/(A) of a mass proportion (P) of the structural unit derived from the polyethylene terephthalate in the polyester to an asphaltene content (A) in the asphalt of 0.15 or more and 3.5 or less.

11. The method of producing an asphalt mixture according to claim 10, wherein in the step of mixing of the Step 2,
(i) the asphalt is added to and mixed with the heated aggregate, and then the polyester was added and mixed,
(ii) the asphalt and the polyester are simultaneously added to and mixed with the heated aggregate, or
(iii) a mixture of the asphalt and the polyester mixed with heat in advance is added to and mixed with the heated aggregate.

12. The method of producing an asphalt mixture according to claim 10, wherein the polyethylene terephthalate is a recovered polyethylene terephthalate.

13. The asphalt composition according to claim 1, wherein the ratio (P)/(A) is 0.8 or more and 3.5 or less.

* * * * *